United States Patent
Guermoud et al.

(10) Patent No.: US 8,351,697 B2
(45) Date of Patent: Jan. 8, 2013

(54) METHOD FOR DETECTION OF FILM MODE OR CAMERA MODE

(75) Inventors: Hassane Guermoud, Ceson Sevigne (FR); Jonathan Kervec, Paimpont (FR); Emmanuel Jolly, Rennes (FR)

(73) Assignee: Thomson Licensing (FR)

( * ) Notice: Subject to any disclaimer, the term of this patent is extended or adjusted under 35 U.S.C. 154(b) by 463 days.

(21) Appl. No.: 12/592,787

(22) Filed: Dec. 3, 2009

(65) Prior Publication Data

US 2010/0246953 A1  Sep. 30, 2010

(30) Foreign Application Priority Data

Dec. 3, 2008 (FR) .................................. 08 58233

(51) Int. Cl.
*G06K 9/00* (2006.01)

(52) U.S. Cl. ....................................... 382/168

(58) Field of Classification Search .................. 382/168, 382/170, 181, 220, 236, 278; 348/441–459, 348/526, 554–558, 672; 375/14, 18, 20
See application file for complete search history.

(56) References Cited

U.S. PATENT DOCUMENTS

| | | | |
|---|---|---|---|
| 5,166,781 A * | 11/1992 | Walby et al. .................. 348/549 |
| 5,734,420 A * | 3/1998 | Lee et al. ......................... 348/97 |
| 5,760,840 A * | 6/1998 | Tani et al. ....................... 348/558 |
| 6,993,182 B2 * | 1/2006 | Yang et al. ..................... 382/168 |
| 7,075,581 B1 * | 7/2006 | Ozgen et al. ................... 348/448 |
| 7,129,990 B2 * | 10/2006 | Wredenhagen et al. ...... 348/449 |
| 7,277,581 B1 * | 10/2007 | Lightstone et al. ........... 382/181 |
| 7,385,648 B2 * | 6/2008 | Grundmeyer et al. ........ 348/441 |
| 7,595,843 B2 * | 9/2009 | Neuman et al. ............... 348/700 |
| 7,643,090 B2 * | 1/2010 | Ramaswamy et al. ........ 348/558 |
| 2003/0185442 A1 | 10/2003 | Yang |
| 2004/0227852 A1 | 11/2004 | Neuman |

FOREIGN PATENT DOCUMENTS

| EP | 1100267 | 5/2001 |
|---|---|---|
| JP | 2008/154169 | 7/2008 |

OTHER PUBLICATIONS

European Search Report dated Jun. 18, 2009.

* cited by examiner

*Primary Examiner* — Jose Couso
(74) *Attorney, Agent, or Firm* — Jack Schwartz and Associates, PLLC (57) ABSTRACT

The present invention relates to a method for detection of film mode or camera mode of a video sequence. This detection is carried out using histograms of video levels of frames of the video sequence. Difference histograms are calculated then compared with each other so as to generate difference parameters for each video frame of the sequence. The pattern formed by these difference parameters is then compared with predetermined patterns to deduce the mode, film or camera, of the sequence. The advantage of this method is that it requires just small memory resources for its implementation and can therefore be implanted in an FPGA circuit.

11 Claims, 5 Drawing Sheets

METHOD FOR DETECTION OF FILM MODE OR CAMERA MODE

FIELD OF THE INVENTION

The present invention relates to the processing of video signals and more specifically to a method of detection of film or camera mode of a sequence of video frames.

TECHNOLOGICAL BACKGROUND

Figure 1:
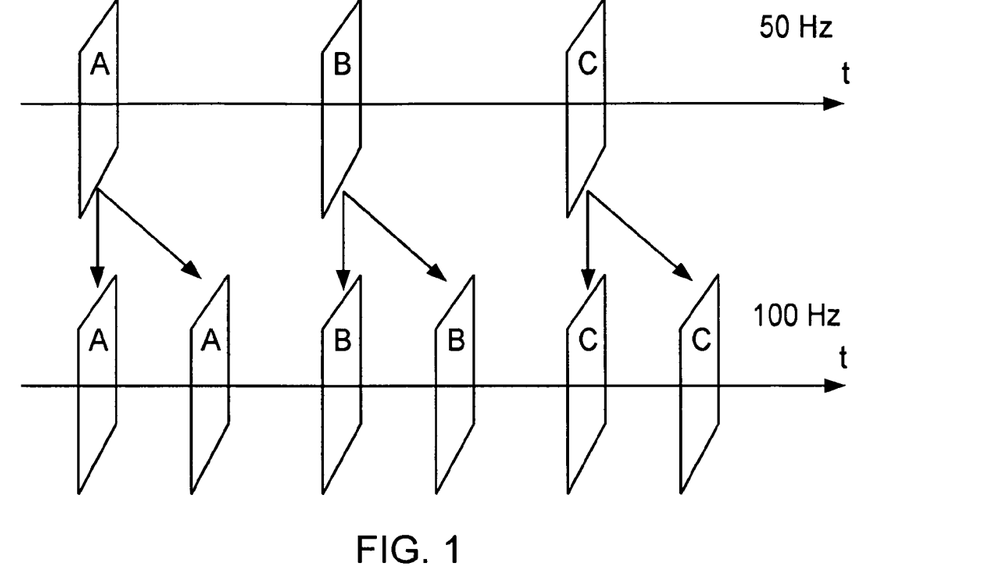
FIG. 1, already described, shows the processing applied to a sequence of video frames consisting in duplicating the video frames of the sequence with a view to reducing the flicker effect during display, FIG. 2, already described, shows the processing applied to a sequence of video frames consisting in duplicating and motion compensating the video frames of the sequence with a view to reducing the flicker effect during display.

The detection of film mode is traditionally used in modern televisions to determine the processes to apply to images received with a view to improving their display quality. Among these processes, it is notably known to convert the frame sequence received into a frame sequence having a higher frequency to suppress the flicker effect that appears on the television screen when the frequency of frames displayed is less than 60 Hz. To do this, in the case of an input frequency at 50 Hz, it is known in the art to double the frame frequency and carry it at 100 Hz. This frequency change consists for example in duplicating the frames of the input sequence, as shown in FIG. 1. In this example, the sequence to be converted, noted as ABC, comprises three frames. The first frame represents image A, the second frame represents image B and the third frame represents image C. The duplication operation consists in transforming this sequence of three frames into a sequence of 6 frames, AABBCC, having a double frequency. The two first frames of the transformed sequence are identical and represent the image A. In the same way, the two following frames represent the image B and the two last frames represent the image C. This duplication operation results in suppressing the flicker effect during the displaying of the new sequence but however creates a judder effect when the displayed images comprise motion.

Figure 2:
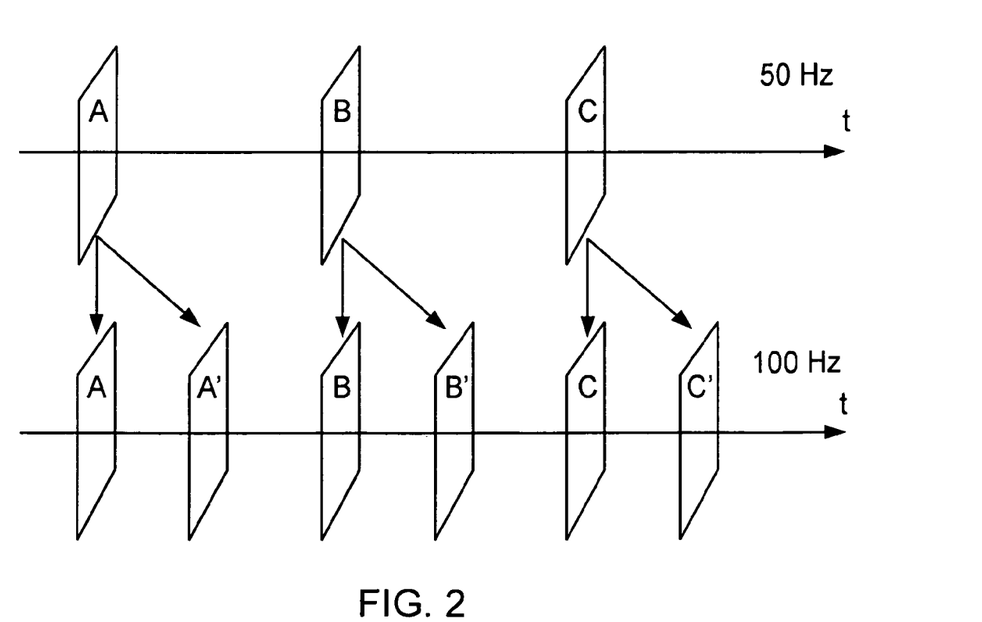

To eliminate this judder effect, it is known in the prior art to compensate the movement of added frames as shown in FIG. 2. In the example illustrate by this figure, the frame representing image A in the input sequence is converted, in the output sequence, into a frame representing image A and a frame representing a motion compensated image A'. To generate image A', the motion is estimated between image A and the next image, which is image B, and an intermediary image is created A' based on the motion estimated between these two images. In the same way, the frame representing image B is converted, in the output sequence, into a frame representing the image B and a frame representing a motion compensated image B' and the frame representing image C is converted, in the output sequence, into a frame representing the image C and a frame representing a motion compensated image C'. This increase in frequency with motion compensation enables suppressing the flicker effect while conserving a fluidity of motion in the sequence.

This type of processing (augmentation of the frequency with or without motion compensation) is however only valid when the input sequence does not comprise duplicated frames, for example when the sequence is in film format (24 or 25 images per second) or in camera format (50 or 60 images per second).

In particular this processing is not applicable when an input sequence, of film format (24 or 25 images per second) origin, has been transformed into a telecine stream by a format conversion of 2:2 pull-down conversion type or a 3:2 pull-down conversion type with a view to its display on a television (50 or 60 images per second). The 2:2 pull-down conversion is used to pass from 25 images per second (film format) to 50 images per second (PAL/SECAM format). This conversion consists in duplicating each input frame. The 3:2 pull-down conversion is used to pass from 24 images per second (film format) to 60 images per second (NTSC format). Each pair of consecutive input frames is then converted into 5 output frames, the three first output frames being identical to the first input frame of the pair and the two other output frames being identical to the second input frame of the pair. In the remainder of the description, reference is made to a video frames sequence in film mode to designate this type of video frames sequence, that originally was in film mode and was converted with a view to its display on a screen and that now comprises duplicated frames, and video frames sequence in video mode or camera mode designates a sequence of video frames in camera format that does not comprise duplicated frames.

With regard to what has preceded, it is easily understood that, for a sequence in film mode (comprising duplicated frames), the processing applied to reduce the flicker creates a great deal of judder when the frames of the sequence in film mode are simply duplicated (without motion compensation) as there is then duplication of already duplicated frames. This judder problem is also present when added frames are motion compensated because, for some among them, the motion estimation is carried out between two identical frames, one being the duplicate of the other. The motion estimation is then null and the motion compensation of no use.

It is therefore important to detect the mode, film or camera, in the sequence of frames to be processed before applying any processing, such as, for example, that described previously to reduce the flicker effect. It can also be of interest to determine the type of film mode of the sequence (film mode 2:2 or film mode 3:2) and identify in the sequence, the frames corresponding to the frames of the original sequence in film format (24 or 25 images per second) between which a motion estimation and a motion compensation can be viably carried out.

Methods for detection of film mode are known in the prior art. All of these methods are based either on a motion estimation, or on Displaced Frame Difference (DFD) and require the complete storage of at least one video frame. When the detection of film mode is carried out by a programmable circuit of FPGA (Field Programmable Gate Array) type, it is then necessary to add an external memory to the FPGA circuit to store said video frame.

SUMMARY OF THE INVENTION

The purpose of the invention is to propose a method for detection of the film mode of a sequence of video frames requiring a small quantity of data to be stored, the data can then be stored in the internal memory of an FPGA circuit.

For this purpose, the present invention relates to a method for detection of film mode or camera mode of a sequence comprising at least three consecutive video frames, characterized in that it comprises the following steps:

determine a histogram of the video levels of each video frame, calculate, for each of the video frames of the sequence, a value representative of the histogram difference, called histogram difference value, between the histogram of said video frame and the histogram of the next video frame, compare the histogram difference value of each of the video frames of the sequence with at least one comparison value to generate, for each of said video frames, a parameter, of difference, whose value is representative of the character different or not to that of said video frame with respect to the next video frame, and compare the pattern formed by the values of difference parameters of video frames of the sequence with a plurality of predetermined patterns to generate mode information identifying the mode, film or camera, of said sequence of video frames.

This method essentially requires the storage of two histograms for the step of calculation of the histogram difference of each video frame. The size of each histogram being in the order of a Kilobyte, the two histograms can therefore be stored locally in a FPGA type programmable circuit.

Advantageously, said mode information also identifies the film mode type of the sequence, for example the film mode 2:2 (sequence initially in film format and having been transformed by a 2:2 pull-down conversion) or the film mode 3:2 (sequence initially in film format and having been transformed by a 3:2 pull-down conversion).

Advantageously, mode information is generated for each video frame of the sequence, said mode information also identifying if the video frame considered is a duplicated video frame or not.

According to a particular embodiment, for a current video frame, said at least one comparison value belongs to a group comprising:
the histogram difference value of the preceding video frame,
the histogram difference value of the next video frame, and
a predetermined threshold value.

According to a particular embodiment, the histogram difference value for a current video frame is determined in the following way:
calculate, for each video level, the difference between the occurrence value of said video level in the current video frame and the occurrence value of said video level in the next video frame so as to generate an occurrence difference for each of said video levels, and
add-up the absolute values of occurrence differences of all the video levels so as to generate said histogram difference value of the current video frame.

According to a variant, the histogram difference value for a current video frame is determined in the following way:
calculate, for each video level i comprised between 0 and N and each offset value j comprised between −n and n, the difference between the occurrence value of the video level i in the current video frame and the occurrence value of the video level i+j in the next video frame, so as to generate at most 2n+1 occurrences for each video level i,
select, for each video level i, the lowest in absolute value occurrence difference, called minimal occurrence, from among said 2n+1 occurrence differences, and
add-up the minimal occurrence differences of all the video levels so as to generate said histogram difference value of the current video frame.

This embodiment variant enables overcoming of a possible video level offset of the current video frame with respect to those of the next video frame or the inverse.

The comparison step intended to generate difference parameters can also be realized in different ways.

According to an embodiment, the histogram difference value is compared with a non-null predetermined threshold value that is a function of the number of pixels contained in the video frames and a predetermined maximum noise allocating said video frames and to the resemblance parameter of the considered video frame are allocated a first value, for example the value "1", if the histogram difference value of the considered video frame is greater than said threshold value and a second value, for example the value "0" if not. The first value of the difference indicates that the considered video frame is different to the next video frame and the second value of the resemblance parameter indicates that the considered video frame is noticeably identical to the next video frame. In this embodiment, the determination of the resemblance parameter is very dependent on the threshold value, which is very dependent on the predetermined maximum noise.

According to an embodiment not comprising a threshold value, to determine the difference parameter of the current video frame, the histogram difference value of said current video frame is compared with the histogram difference value of the preceding video frame and with the histogram difference value of the next video frame, then a first value, for example the value "1" is allocated to the difference parameter of the current video frame, if said histogram difference value of said current video frame is greater than, at the same time, said histogram difference value of said next video frame and said histogram difference value of said preceding video frame and a second value, for example the value "0" if not. As in the previous embodiment, the resemblance parameter value indicates that the video frame considered is different to the next video frame and the second resemblance parameter value indicates that the considered video frame is noticeably identical to the next video frame.

Advantageously, the method of the invention also comprises, prior to the step of determination of video level histograms, a step of spatial filtering of video frames of the sequence in order to smooth their video content and thus reduce the influence of noise content in the video frames on the detection.

Advantageously, the method of the invention also comprises, prior to the step of comparison of the pattern formed by the difference parameters to the predetermined patterns, a step of temporal filtering of said difference parameters sequence.

According to a particular embodiment, a mode information is generated for each video frame of said sequence, said mode information also comprising a bit indicating if said video frame is a source video frame or not.

Finally, another purpose of the invention is a device to implement the method described previously. More specifically, the invention also relates to a device for detection of the film mode or camera mode of a sequence comprising at least three consecutive video frames, characterized in that it comprises:
a first calculation circuit to determine a histogram of video levels of each of the video frames,
a second calculation circuit to calculate, for each of the video frames of the sequence, a value representative of the histogram difference, called histogram difference, between the histogram of said video frame and the histogram of the next video frame,
a first comparison circuit to compare the histogram difference value of each of the video frames of the sequence with at least one comparison value and generate, for each of said video frames, a parameter, of difference, whose value is representative of the character different or not to that of said video frame with respect to the next video frame, and
a second comparison circuit to compare the pattern formed by the values of difference parameters of video frames of the sequence with a plurality of predetermined patterns to generate mode information (MODE) identifying the mode, film or camera, of said sequence of video frames, a control unit to control said first and second calculation circuits and said first and second comparison circuits.

BRIEF DESCRIPTION OF THE FIGURES

The invention will be better understood, and other purposes, details, characteristics and advantages will appear more clearly during the following detailed explanatory description of two currently preferred particular embodiments of the invention, with reference to the annexed diagrammatic drawings, wherein.

DETAILED DESCRIPTION OF THE EMBODIMENTS OF THE INVENTION

In the next part of the present description, the term video frame is used to designate a frame corresponding to an image or part of an image (for example, a half-image in the case of an interlaced scanning). This video frame can indifferently belong to a sequence in film mode or video mode.

Moreover, as indicated previously, a sequence of video frames in film mode designates a sequence of frames comprising one or more frames duplicated following a 2:2 or 3:2 format conversion. Naturally, other format conversions exist, such as 2:3 or 3:2:3:2:2, but we restrict ourselves here to the detection of sequences in 3:2 or 2:2 film mode. A sequence of video frames in video mode or camera mode designates a sequence of video frame in camera format not comprising duplicated frames.

Finally, a source video frame designates a non-duplicated video frame from a sequence of video frames forming a film (24 or 25 images per second) or in video format (50 or 60 images per second).

According to the invention, the detection of film or camera mode of the sequence is based on the calculation and comparison of histograms of video levels of video frames of the sequence to be analysed.

Figure 3:
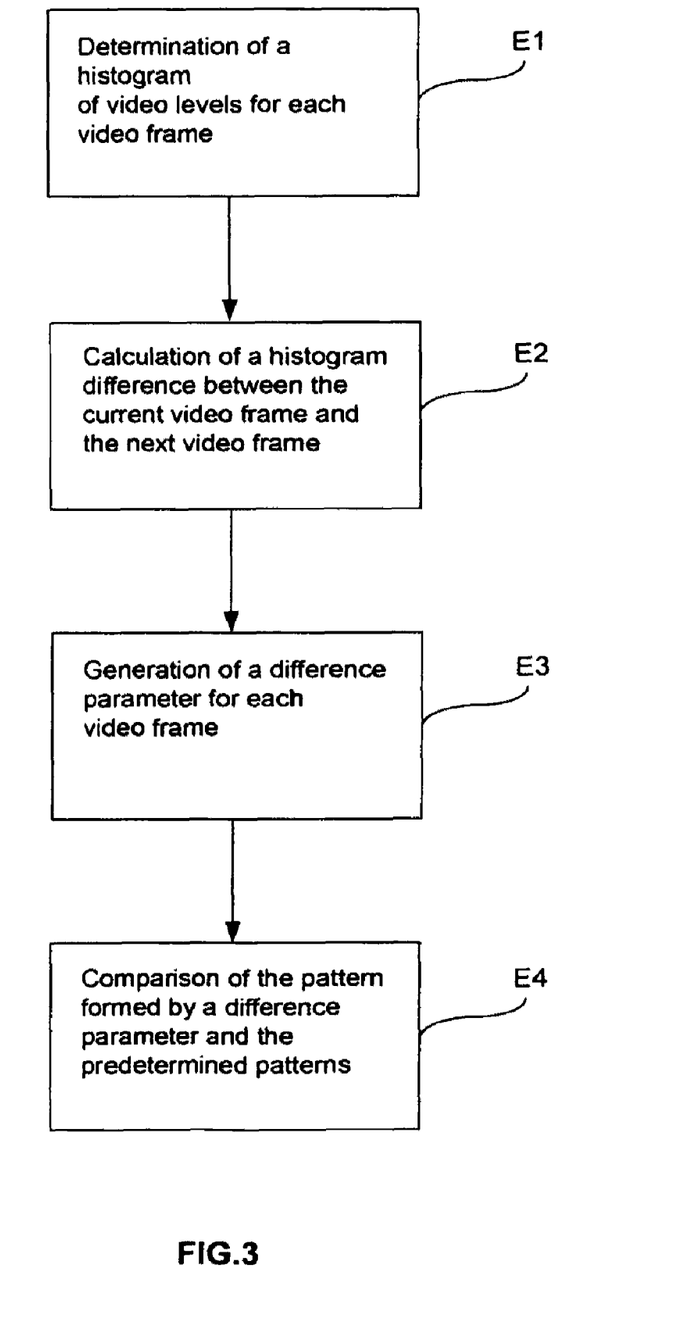
FIG. 3 is a flowchart of the steps of the method of the invention.

A flowchart of steps of the method of the invention is shown in FIG. 3. These steps are also shown by the embodiment represented in FIG. 4. In this example the method is applied to 4 consecutive video frames referenced T, T+1, T+2 and T+3.

Figure 4:
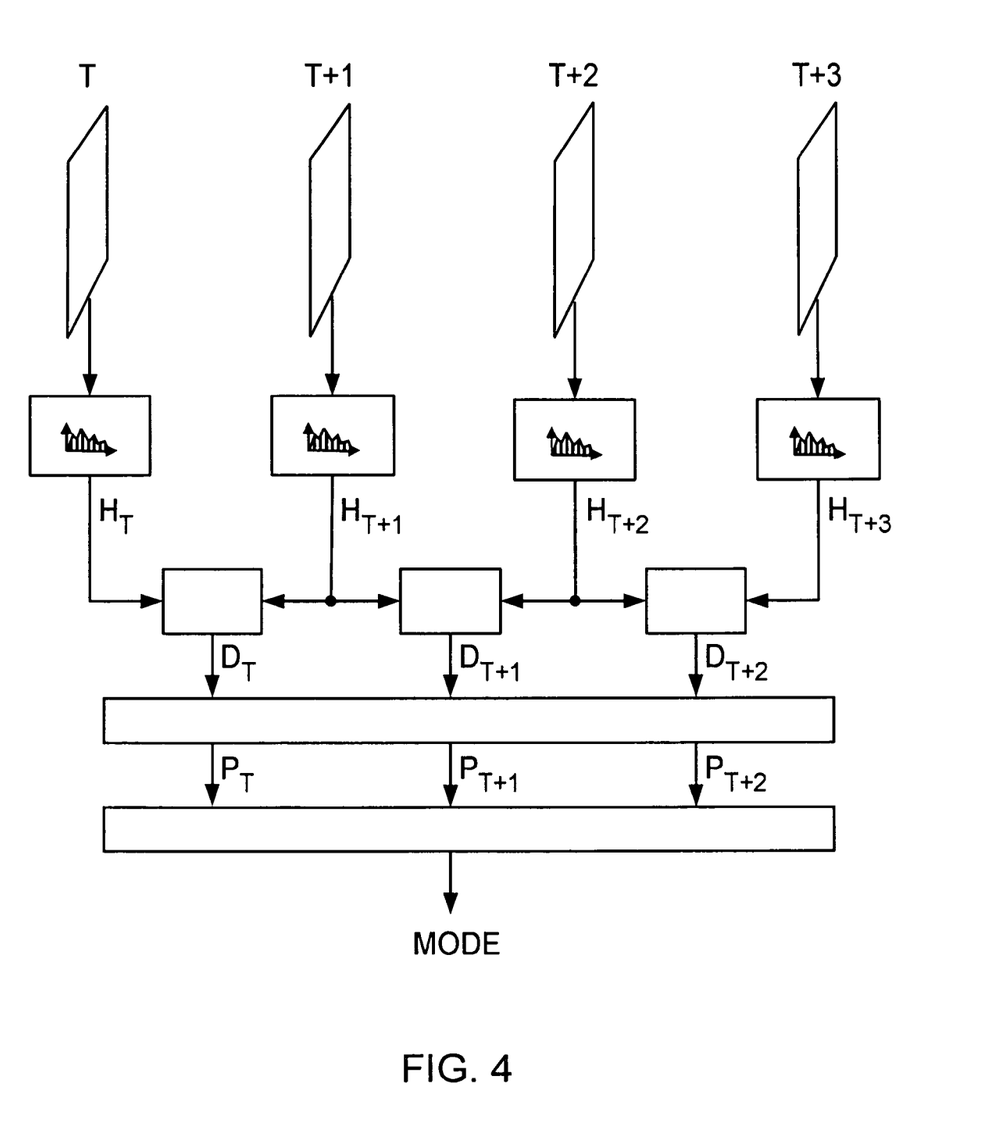
FIG. 4 shows the steps of the method of the invention when applied to a sequence of 4 video frames.

According to a first step, referenced E1, a histogram of video levels is determined for each video frame of the sequence. Thus are determined, for each video level, its occurrence in the video frame being considered. If the video levels are coded on 8 bits, 256 occurrence values are then obtained each associated with a specific video level. In the example of FIG. 4, the histogram of video levels of each of the 4 video frames is calculated. 4 histograms are then obtained noted as $H_T$, $H_{T+1}$, $H_{T+2}$ and $H_{T+3}$.

According to a second step, referenced E2, a value representative of the difference between the video frame being considered and the histogram of the next video frame is then calculated for each of the video frames. This value, referred to as histogram difference value and noted as $D_T$ for the frame T, is for example obtained in the following way:

$$D_T = \sum_{i=0}^{255} |H_T(i) - H_{T+1}(i)|$$

where $-H_T(i)$ is the occurrence value of video level i in the histogram $H_T$ of the video frame T, and $-H_{T+1}(i)$ is the occurrence value of video level i in the histogram $H_{T+1}$ of the video frame T+1.

In this example and in the remainder of the description, it is considered that the video levels of video frames are coded on 8 bits and have a value comprised between 0 and 255.

Thus are calculated, for each video level i, the difference between the occurrence value $H_T(i)$ of the video level i in the current video frame and the occurrence value $H_{T+1}(i)$ of this video level in the next video frame. This occurrence difference $H_T(i)-H_{T+1}(i)$ is calculated for all the video levels then the absolute values of all these occurrence differences are added to generate the value of the histogram difference of the video frame T.

If the contents of histograms of video frames T and T+1 are very close or identical, the value $D_T$ is then low or null.

In the example of FIG. 4, are thus obtained, from step E2, 3 histogram difference values noted as $D_T$, $D_{T+1}$ and $D_{T+2}$ respectively for the video frames T, T+1 and T+2.

According to an embodiment variant, the value of the histogram difference $D_T$ is calculated differently to overcome a noise that would offset the video levels of one video frame with respect to another. According to this variant, for each video level i, are calculated, not only, the difference between its occurrence value in the frame T and its occurrence value in the frame T+1 but also the difference between its occurrence value in the frame T and the occurrence value of the neighbouring video levels i+j in the frame T+1 and only the minimum difference value is retained. If restricted to the closest video levels (that is the levels i−1 and i+1), the histogram difference is expressed by the following equation:

$$D_T = \sum_{i=0}^{255} \min(|H_T(i) - H_{T+1}(i)|, |H_T(i) - H_{T+1}(i-1)|, |H_T(i) - H_{T+1}(i+1)|)$$

Figure 5:
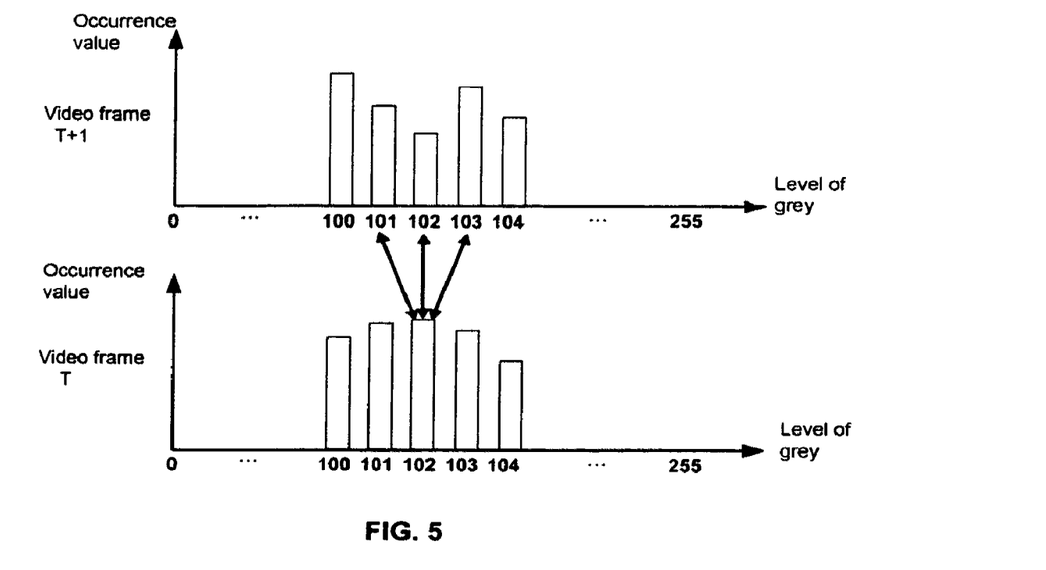
FIG. 5 shows an embodiment of the step calculation of a histogram difference of the method of FIG. 3.

This variant is shown by an example in FIG. 5. To calculate the histogram difference for the video level 102 of the frame T, $|H_T(102)-H_{T+1}(102)|$, $|H_T(102)-H_{T+1}(103)|$ and $|H_T(102)-H_{T+1}(101)|$ are calculated and the minimum value is selected. To calculate the value of the histogram difference $D_T$, this calculation and this selection are carried out for each video level and the selected minimum values are added.

According to a third step, referenced E3, for each of the video frames, the value of the histogram difference of the current video frame is compared to at least one other histogram difference value or one predetermined threshold value to deduce a difference parameter, noted as $P_T$ for the current video frame T, representative of the character different or not of the current video frame with respect to the next video frame. If the two video frames are different, a value "1" is assigned to the difference parameter of the current video frame and if not it is assigned a value "0".

More than one embodiments are possible to carry out this step E3 of comparison and generation of the difference parameter.

According to a first embodiment, the histogram difference parameter is compared to a predetermined threshold value S0. This value is not null as account must be taken of a possible noise affecting the compared video frames. This threshold value S0 is a function of the number of pixels in the considered video frame and a maximum noise affecting each video frame. If the histogram difference value is greater than or equal to the threshold value S0, the value "1" is assigned the difference parameter $P_T$ and if the histogram difference value is less than the threshold value S0, it is assigned the value "0". This threshold value S0 is a number of pixels and is for example equal to a percentage of the total number of pixels of the video frame, this percentage defining the maximum number of pixels affected by noise in the video frame. This percentage is for example 5%. It is considered then that the noise affects a maximum of 5% of the pixels of the frame. In the case of an image in HD-Ready format (1366*768 pixels), the threshold value S0 is for example equal to 1366*768*0.05=52424,4 pixels.

According to a second embodiment without a threshold value, the histogram difference value of the current video frame is compared to those of the next video frame and the preceding video frame. For example, for a current frame T, a value "1" is assigned to the difference parameter $P_T$ if the two following conditions are respected:

$$D_T > D_{T-1}$$

$$D_T > D_{T+1}$$

Figure 6:
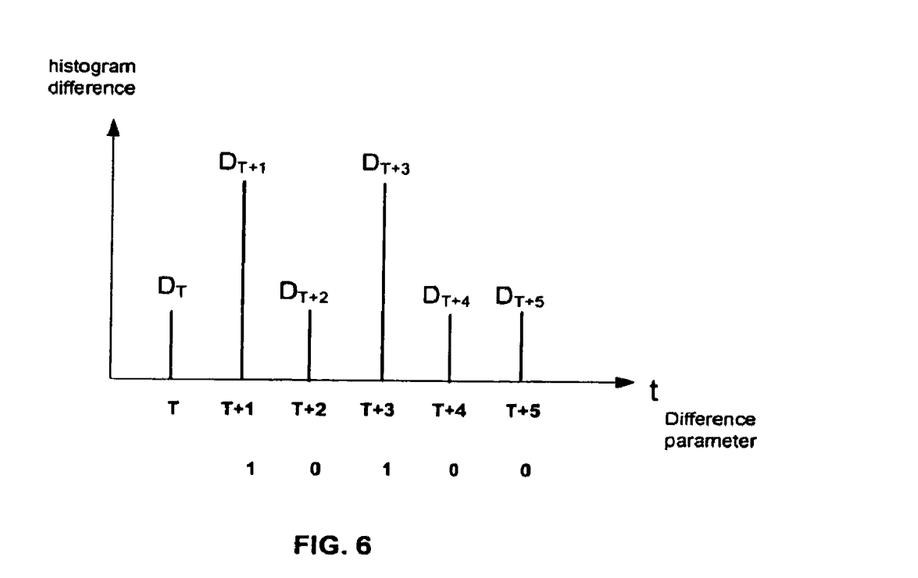
FIG. 6 shows an embodiment of the step generation difference parameters of the method of FIG. 3.

In other cases, the value "0" is assigned to the difference parameter $P_T$. This comparison step is shown in FIG. 6 in the case of a sequence in 3:2 film mode for which the histogram differences $D_T$, $D_{T+1}$, $D_{T+2}$, $D_{T+3}$, $D_{T+4}$ and $D_{T+5}$ have been calculated. The histogram differences $D_{T+1}$ and $D_{T+3}$ respect the two conditions described previously. The value "1" is thus assigned to the difference parameters $P_{T+1}$ and $P_{T+3}$ and the value "0" is assigned to the other difference parameters. The characteristic sequence 10100 is then obtained.

This second embodiment of the step E3 has the advantage of not using a threshold value as defined in the preceding embodiment.

Naturally, other embodiments of step E3 comparing only the histogram difference $D_T$ with one or other of the histogram differences $D_{T+1}$ or $D_{T-1}$ and possibly with a threshold value, can be imagined.

If reference is again made to FIGS. 3 and 4, the last step, referenced E4, of the method of the invention consists in comparing the pattern formed by the difference parameters of video frames determined in step E3 with the predetermined patterns corresponding to the camera mode and to different film modes to deduce if the sequence of video frames processed is in camera mode or in film mode. Advantageously, this comparison of patterns also enables to determine the type of film mode of the sequence, for example a 2:2 film mode or a 3:2 film mode, and the position of source video frames (non-duplicated video frames) in the sequence.

Basically, a pattern formed of two consecutive difference parameters $P_T$ and $P_{T+1}$ suffices to differentiate a sequence in camera mode and a sequence in film mode. A pattern 11 corresponds to the camera mode and a pattern 01 or 10 corresponds to film mode. According to a preferred embodiment, the pattern comprises a greater number or consecutive difference parameters to differentiate between different types of film mode. At least 6 consecutive difference parameters are required to differentiate clearly between a 3:2 film mode and a 2:2 film mode.

In the following table, eight predetermined patterns each comprising 6 consecutive difference parameters values have been defined. Pattern no 1 relates to camera mode. The patterns no 2 and no 3 relate to 2:2 film mode and are formed from the repetition of the elementary pattern 01 characterizing the 2:2 film mode. The patterns 4 to 8 relate to 3:2 film mode and are formed from the repetition of the elementary pattern 10010 characterizing the film mode 3:2.

| N° | motif formé par les paramètres de différence de 6 trames vidéo consécutives | | | | | | Mode |
|---|---|---|---|---|---|---|---|
| 1 | 1 | 1 | 1 | 1 | 1 | 1 | mode caméra |
| 2 | 0 | 1 | 0 | 1 | 0 | 1 | mode film 2:2 |
| 3 | 1 | 0 | 1 | 0 | 1 | 0 | mode film 2:2 |
| 4 | 0 | 0 | 1 | 0 | 1 | 0 | mode film 3:2 |
| 5 | 1 | 0 | 0 | 1 | 0 | 1 | mode film 3:2 |
| 6 | 0 | 1 | 0 | 0 | 1 | 0 | mode film 3:2 |
| 7 | 1 | 0 | 1 | 0 | 0 | 1 | mode film 3:2 |
| 8 | 0 | 1 | 0 | 1 | 0 | 0 | mode film 3:2 |

In this table:

the pattern no 1 relates to a sequence of video frames in camera mode, each video frame of the sequence relates to a different source video frame, the 6 video frames for which a difference parameter was determined relating to 6 different source video frames, the sequence can then be written ABCDEF where each letter represents a specific source video frame, the pattern no 2 relates to a sequence of video frames in 2:2 film mode in which the first video frame is identical to the second video frame (sequence: AABBCC), the pattern no 3 relates to a sequence of video frames in 2:2 film mode in which the first frame is different to the second frame (sequence: ABBCCD), the pattern no 4 relates to a sequence of video frames in 3:2 film mode in which the three first frames are identical (sequence: AAABBC), the pattern no 5 relates to a sequence of video frames in 3:2 film mode in which the second, third and fourth video frames are identical (sequence: ABBBCC), the pattern no 6 relates to a sequence of video frames in 3:2 film mode in which the third, fourth and fifth video frames are identical (sequence: AABBBC), the pattern no 7 relates to a sequence of video frames in 3:2 film mode in which the fourth, fifth and sixth video frames are identical (sequence: ABBCCC), and the pattern no 8 relates to a sequence of video frames in 3:2 film mode in which the fifth, sixth and seventh video frames are identical (sequence: AABBCC).

Thus, the patterns no 3 to 8 relate to the 3:2 film mode, the elementary pattern 10100 characteristic of this mode being offset by one frame from one pattern to another.

As can be seen, the distinction between the camera mode and the film mode can be realized from three consecutive video frames. The three video frames enable two histogram differences and two parameter differences to be calculated if the first embodiment of the step E3 is used (comparison of histogram differences with a threshold S0). This distinction requires an additional video frame if the second embodiment of the step E3 is used.

Then, the distinction between the 2:2 film mode (sequence no 3) and the 3:2 film mode (sequence no 8) can be realized from seven consecutive video frames. The seven video frames enable six histogram differences and six parameter differences to be calculated if the first embodiment of the step E3 is used (comparison of histogram differences with a threshold S0). This distinction requires an additional video frame if the second embodiment of the step E3 is used.

Preferably, the determination of difference parameters is carried out on a high number of video frames, at least twenty consecutive video frames. A temporal filtering can then be applied on the pattern formed by the difference parameters to more clearly reveal the repetition of the elementary pattern (10 for the 2:2 film mode and 10100 for the 3:2 film mode) and thus correct the sequence suppressing the errors due to noise before carrying out step E4.

Resulting from step E4, mode information, noted as MODE in FIG. 4, is thus obtained, identifying the camera mode or film mode of the sequence. According to an advantageous embodiment, the mode information also identifies the type of film mode. This information comprises for example 2 bits. The film and camera modes and the types of film mode are identified in the following way:

| Modes | MODE [1 ... 0] |
|---|---|
| Mode caméra | 00 |
| Mode film 2:2 | 01 |
| Mode film 3:2 | 10 |

According to a preferred embodiment, mode information MODE is delivered for each video frame of the processed sequence, the mode information then comprising an additional bit MODE[3] indicating if the processed video frame is a source video frame or a duplicated video frame.

| Trame | MODE [3] |
|---|---|
| Trame vidéo source | 1 |
| Trame vidéo dupliquée | 0 |

In the embodiment described here in detail where $D_T$ is a histogram difference between the frame T and the frame T+1, the source video frames (MODE[3]=1) are video frames T having a parameter difference $P_T$ equal to 0 and that are preceded by a video frame T−1 having a difference parameter $P_{T-1}$ equal to 1. The other video frames are duplicated video frames (MODE[3]=0).

Advantageously, a spatial filtering is applied to the video frames, at the start of the method, to smooth their content and reduce the influence of noise on the process of determination of the mode of the sequence.

This method only requires the storage of two histograms of video levels and the predetermined sequences. The resources in memory required to store two histograms are:
Format HD-Ready (1366*768)
  maximum number of pixels per histogram class=1366*768=1049088 or 21 bits
  256 video levels or 256 classes in the histogram
  memory size=2*21*256=10752 bits
Format Full-HD (1920*1080)
  maximum number of pixels per histogram class=1920*1080=2073600 or 21 bits
  256 video levels or 256 classes in the histogram
  memory size=2*21*256=10752 bits The memory resources of a standard FPGA circuit are therefore sufficient.

Figure 7:
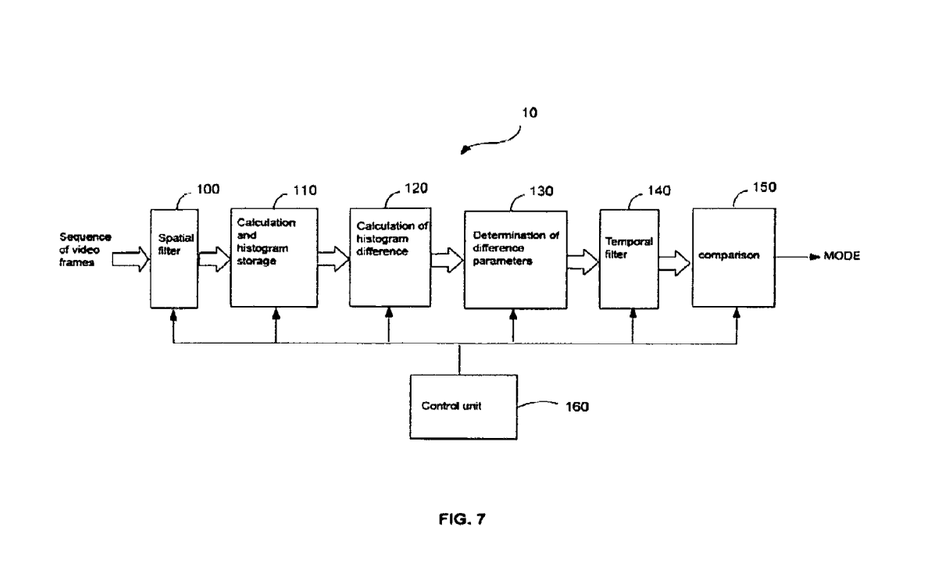
FIG. 7 shows a device capable of implementing the method of the invention.

The present invention also relates to a device, referenced 10 in FIG. 7, able to implement the method described previously. In this figure, the modules shown are functional units that may or may not correspond to physically distinguishable units. For example, these modules or some of them can be grouped together in a single component, or constitute functions of the same software. Conversely, some modules may be composed of separate physical entities. The device 10 comprises: a spatial filter 100 to smooth the video content of video frames at input to the device, a circuit for calculation and storage of histograms 110 to calculate and store histograms of video frames in compliance with step E1 of the method of the invention, a circuit for calculation of histogram difference 120 to determine, from histograms stored in the circuit 110 and for each video frame, a histogram difference in compliance with step E2 of the method of the invention, a first comparison circuit 130 to determine, from the histogram differences, a difference parameter in compliance with step E3 of the method of the invention, a temporal filter 140 to temporally filter the sequence of difference parameters generated by the circuit 130, a second comparison circuit 150 to compare the difference parameters with predetermined patterns to deliver mode information MODE and finally a control unit 160 to control the set of circuits 100 to 150.

Although the invention has been described in relation to different particular embodiments, it is obvious that it is in no way restricted and that it comprises all the technical equivalents of the means described together with their combinations if the latter fall within the scope of the invention.

The invention claimed is:

1. Method for detection of film mode or camera mode of a sequence comprising at least three consecutive video frames, wherein it comprises the following steps, carried out by a processing unit:
   determine a histogram of the video levels of each of the video frames,
   calculate, for each of the video frames of the sequence, a value representative of the histogram difference, called histogram difference value, between the histogram of said video frame and the histogram of the next video frame,
   compare the histogram difference value of each of the video frames of the sequence with at least one comparison value to generate, for each of said video frames, a parameter, of difference, whose value is representative of the character different or not to that of said video frame with respect to the next video frame, and
   compare the pattern formed by the values of difference parameters of video frames of the sequence with a plurality of predetermined patterns to generate mode information identifying the mode, film or camera, of said sequence of video frames.

2. Method according to claim 1, wherein, for a current video frame, said at least one comparison value belongs to a group comprising:
   the histogram difference value of the preceding video frame,
   the histogram difference value for the next video frame, and
   a predetermined threshold value.

3. Method according to claim 1, wherein, to calculate the histogram difference value for a current video frame, the following steps are carried out:
   calculate, for each video level, the difference between the occurrence value of said video level in the current video frame and the occurrence value of said video level in the next video frame so as to generate an occurrence difference for each of said video levels, and add-up the absolute values of occurrence differences of all the video levels so as to generate said histogram difference value of the current video frame.

4. Method according to claim 1, wherein, to calculate the histogram difference value for a current video frame, the following steps are carried out:

calculate, for each video level i comprised between 0 and N and each offset value j comprised between −n and n, the difference between the occurrence value of the video level i in the current video frame and the occurrence value of the video level i+j in the next video frame, so as to generate at most 2n+1 occurrences for each video level i, select, for each video level i, the lowest absolute value occurrence difference, called minimal occurrence, from among said 2n+1 occurrence differences, and add-up the minimal occurrence differences of all the video levels so as to generate said histogram difference value of the current video frame.

5. Method according to claim 1, wherein, generate the difference parameter of a current video frame, the following steps are carried out:

the histogram difference value of said current video frame is compared with a predetermined non-null threshold value, and a first value ("1") is assigned to the difference parameter of the current video frame if the histogram difference vale of the current video frame is greater than said threshold value and a second value ("0") is assigned if not.

6. Method according to claim 1, wherein, to generate the difference parameter of a current video frame, the following steps are carried out:

said histogram difference value of said current video frame is compared with the histogram difference value of the preceding video frame and with the histogram difference value of the next video frame, and a first value ("1") is assigned to the difference parameter of the current video frame if said histogram difference value of said current video frame is greater than both the histogram difference value of the next video frame and the histogram difference value of the preceding video frame and the second value ("0") is assigned if not.

7. Method according to claim 1, wherein it also comprises, previous to step of determination of video level histograms, a step of spatial filtering of video frames of the sequence.

8. Method according to claim 1, wherein it also comprises, previous to the step of comparison of the pattern formed by the difference parameters with the predetermined patters, a step of temporal filtering of said difference parameters pattern.

9. Method according to claim 1, wherein said mode information identifies the type of film mode of said sequence of video frames.

10. Method according to claim 1, wherein a mode information (MODE) is generated for each video frame of said sequence, said mode information also comprising a bit indicating if said video frame is a source video frame or not.

11. Device for detection of the film mode or camera mode of a sequence comprising at least three consecutive video frames, characterized in that it comprises:

a first calculation circuit to determine a histogram of video levels of each of the video frames, a second calculation circuit to calculate, for each of the video frames of the sequence, a value representative of the histogram difference, called histogram difference, between the histogram of said video frame and the histogram of the next video frame, a first comparison circuit to compare the histogram difference value of each of the video frames of the sequence with at least one comparison value and generate, for each of said video frames, a parameter, called difference, whose value is representative of the character different or not to that of said video frame with respect to the next video frame, a second comparison circuit to compare the pattern formed by the values of difference parameters of video frames of the sequence with a plurality of predetermined patters to generate mode information identifying the mode, film or camera, of said sequence video frames, and a control unit (160) to control said first and second calculation circuits and said first and second comparison circuits.

\* \* \* \* \*